United States Patent [19]

Yamashita et al.

[11] Patent Number: 5,021,900
[45] Date of Patent: Jun. 4, 1991

[54] TAPE GUIDE DRIVING DEVICE FOR ROTATING HEAD TYPE TAPE PLAYER

[75] Inventors: Tatsumaro Yamashita; Seiichi Nagai, both of Shibata, Japan

[73] Assignee: Alps Electric Co., Ltd., Tokyo, Japan

[21] Appl. No.: 439,744

[22] Filed: Nov. 21, 1989

[30] Foreign Application Priority Data

Mar. 3, 1989 [JP]  Japan .................. 1-24630

[51] Int. Cl.$^5$ ..................... G11B 15/60; G11B 5/027
[52] U.S. Cl. ........................... 360/85; 360/95; 360/130.21
[58] Field of Search .................... 360/84–85, 360/95, 130.2–130.24

[56] References Cited

U.S. PATENT DOCUMENTS

| | | | |
|---|---|---|---|
| 4,661,864 | 4/1987 | Kuwajima | 360/85 |
| 4,777,546 | 10/1988 | Nagasawa et al. | 360/85 |
| 4,951,163 | 8/1990 | Nakamichi | 360/130.21 |

FOREIGN PATENT DOCUMENTS 2169125A 7/1986 United Kingdom .

*Primary Examiner*—John H. Wolff
*Attorney, Agent, or Firm*—Guy W. Shoup; Paul J. Winters

[57] ABSTRACT

A tape guide driving device for a rotating head type tape player having a mechanism for moving separately from each other a pinch roller and a tape guide. The rotating head type tape player includes a rotating head device, a capstan, and a tape feeding member that pulls a magnetic tape from an inserted cassette pack and moves it to a position at which it is wound on the rotating head device and to the position of the capstan provided on a chassis. A roller lever is provided that supports the pinch roller and moves the pinch roller from a position opposed to the inside of the tape within a cassette pack to the position close to the capstan, and a guide lever supports the tape guide and moves the tape guide from a position opposed to the inside of the tape within the cassette pack.

During operation, the guide lever is pressed by the movement of the roller lever having the pinch roller which causes the tape guide to move. A guide section is formed in the form of an arch separated by a fixed distance to the rotation center of the roller lever, and a projection provided on the guide lever is made to contact the guide section by an elastic member. If the roller lever rotates, the positions of the guide lever and the tape guide are not changed.

1 Claim, 5 Drawing Sheets

TAPE GUIDE DRIVING DEVICE FOR ROTATING HEAD TYPE TAPE PLAYER

BACKGROUND OF THE INVENTION

1. Field of the Invention

The present invention relates to a rotating head type tape player used for DATs, particularly, to a tape guide driving device that moves a tape guide during the tape loading operation of feeding a magnetic tape.

2. Description of the Related Art

FIG. 6 is a plan view illustrating the state that a magnetic tape is loaded to a running position in a conventional rotating head type tape player.

A rotating head device 2 and a capstan 3 are provided in a chassis 1. Each of them is adapted to be driven by a motor. When the cassette pack C is installed on the chassis 1, feeding bases 4 and 5 move upwardly along the guide grooves 1a and 1b of the chassis 1. A magnetic tape T is fed by loading posts 4a, 5a and loading pins 4b, 5b provided on these bases 4 and 5. The magnetic tape T is wound on the rotating head device 2, and is moved to the position at which it makes contact with a capstan 3. In this operation, the pinch roller 6 moves from the position denoted by (a) to the position denoted by (b). In addition, in the play mode for recording or reproducing, the pinch roller 6 is moved to the position indicated by (c), and the magnetic tape T is hooked by the pinch roller 6 and the capstan 3. Furthermore, as the tape is loaded, the tape guide 7 is moved from the position shown by (d) to the position shown by (e).

In the play mode, the magnetic tape T is run according to the rotation speed of the capstan 3, and the magnetic tape is scanned by the rotating head provided on the rotating head device 2.

Taking note of the operation of the pinch roller 6 and the tape guide 7 during the tape loading operation described above, at the time of completion of the tape loading operation, the pinch roller 6 moves from the position indicated by (a) to the position indicated by (b). In addition, the pinch roller moves to the position (c) at the time of change to the play mode. On the other hand, the tape guide 7 moves only from the position indicated by (d) to the position indicated by (e). As described above, although the pinch roller 6 and the tape guide 7 move to very close positions, since they must move separately, moving each of them by using the same driving mechanism is impossible. If they are both moved by the same mechanism, at the completion of tape loading operation when the pinch roller 6 moves to the position of (b), the tape guide 7 would move to the position of (e). Further, when the pinch roller 6 moves to the position of (c), the tape guide 7 would move farther from the position of (e). And an additional, excessive feeding force would be applied to a magnetic tape which has been already loaded. Therefore, a mechanism for moving the pinch roller and tape guide separately is necessary, resulting in a very complicated mechanism to be placed on the chassis 1.

SUMMARY OF THE INVENTION

The present invention solves the above-described problems. It is an objective of the present invention to provide a tape guide driving device for a rotating head type tape player, adapted to move the pinch roller and the tape guide by the same mechanism and to move them separately from each other.

In a rotating head type tape player with a rotating head device and a capstan, and a tape feeding member that pulls out a magnetic tape from an inserted cassette pack and moves it to the position at which it is wound on said rotating head device and to the position of a capstan provided on a chassis, a tape guide driving device for a rotating head type tape player in accordance with the present invention is characterized in that there are provided a roller lever supporting the pinch roller and moving the pinch roller from the position opposed to the inside of the tape within a cassette pack to the position close to the capstan, and a guide lever supporting the tape guide and moving the tape guide from the position opposed to the inside of the tape within the cassette pack, said roller lever being provided with a press section pressing the projection provided on said guide lever while the pinch roller comes close to the capstan and a guide section on which a projection of said guide lever slides while the pinch roller rotates from the position close to the capstan to the position at which the pinch roller strikes the capstan, said guide section being formed at a fixed radius to the rotation center of the roller lever and being provided with an elastic member for contacting said projection with this guide section.

In the above-described means, during the tape loading operation, the guide lever is pressed by the movement of the roller lever having a pinch roller, which causes the tape guide to move. At this time, up to the position at which the pinch roller comes close to the capstan, the projection provided on the guide lever is pressed by the roller lever and the tape guide moves to the position at which it guides a tape. After that, when the roller lever moves to the position at which the pinch roller hits the capstan, the guide section slides the projection provided on the guide lever. Since this guide section is formed in the form of an arc separated by a fixed distance to the rotation center of the roller lever and the projection is made to contact the above-described guide section by an elastic member, if the roller lever rotates, the positions of the guide lever and the tape guide are not changed. By constructing in this way, the pinch roller and the tape guide can be moved by the same mechanism, and furthermore the position of the tape guide will not be changed after the tape loading operation is completed.

DESCRIPTION OF THE PREFERRED EMBODIMENTS

The embodiment of the present invention will be explained hereinunder with reference to the drawings.

Figure 1:
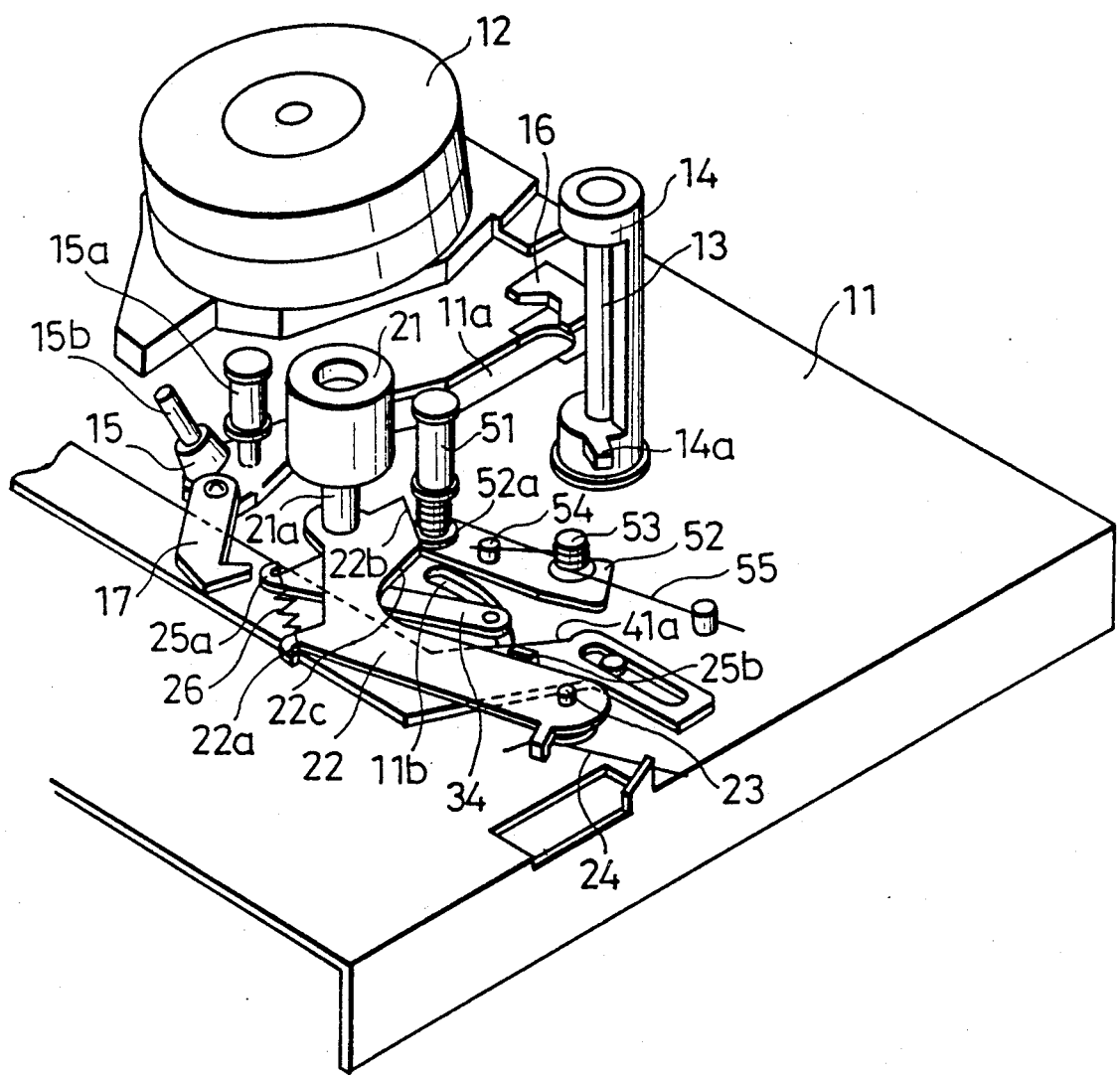
FIG. 1 is a perspective view illustrating the tape guide driving device for the rotating head type tape player in accordance with the present invention.
Figure 2:
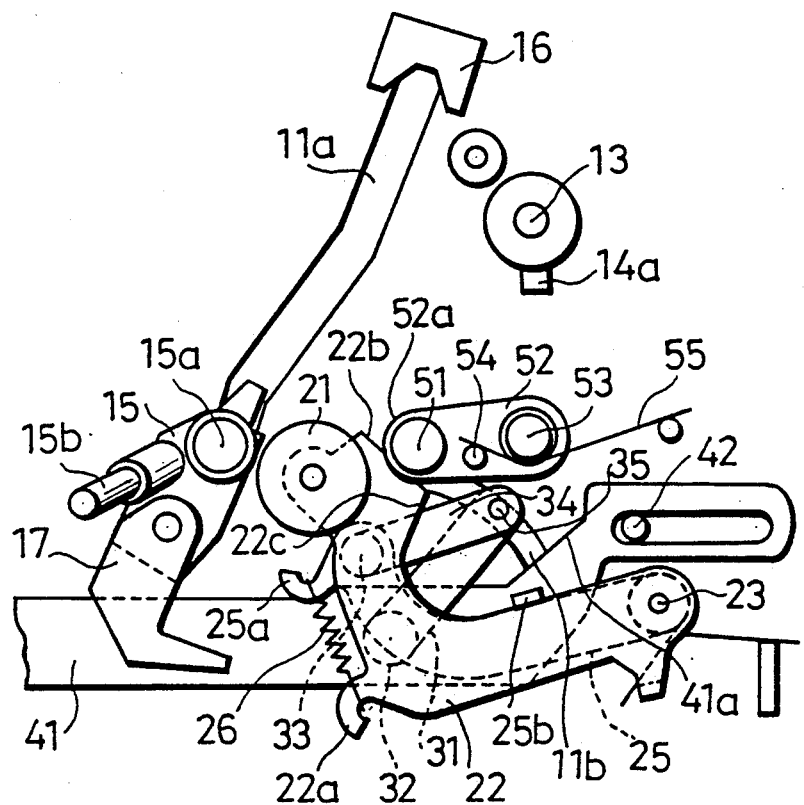
FIGS. 2 and 3 are plan views for each of the operations.
Figure 3:
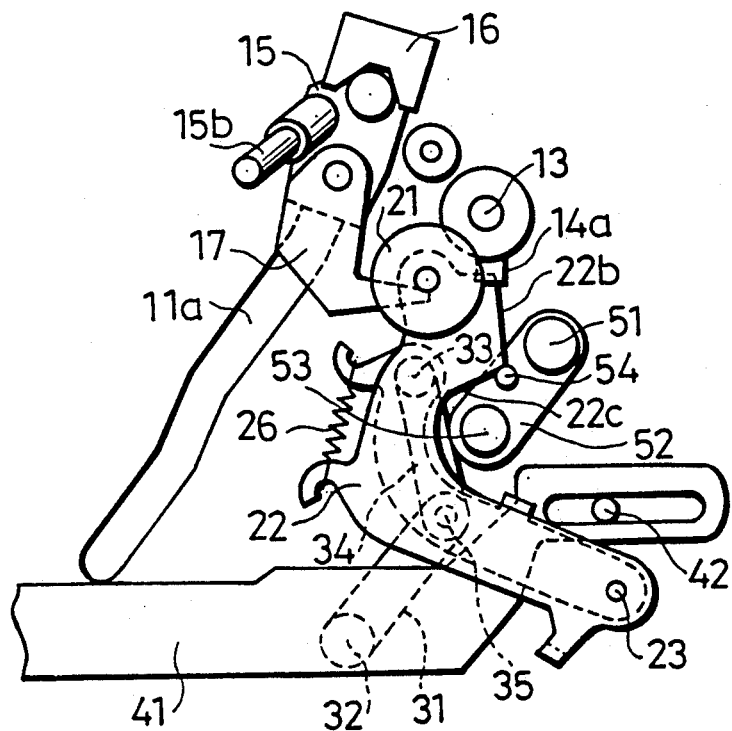

FIG. 1 is a perspective drawing illustrating the tape guide driving device in accordance with the present invention. FIGS. 2 and 3 are plan views for each of the operations.

In FIG. 1, reference numeral 11 indicates a chassis. A rotating head device 12 is provided on the chassis 11, and on the side is provided a capstan 13. This capstan 13 is supported by a housing 14 so as to be rotatable up and down. The capstan 13 is driven by the capstan motor provided on the rear side of the chassis 11. A positioning projection 14a for positioning the front end of a roller lever 22 described later is integrally formed at the lower end of the housing 14.

Figure 6:
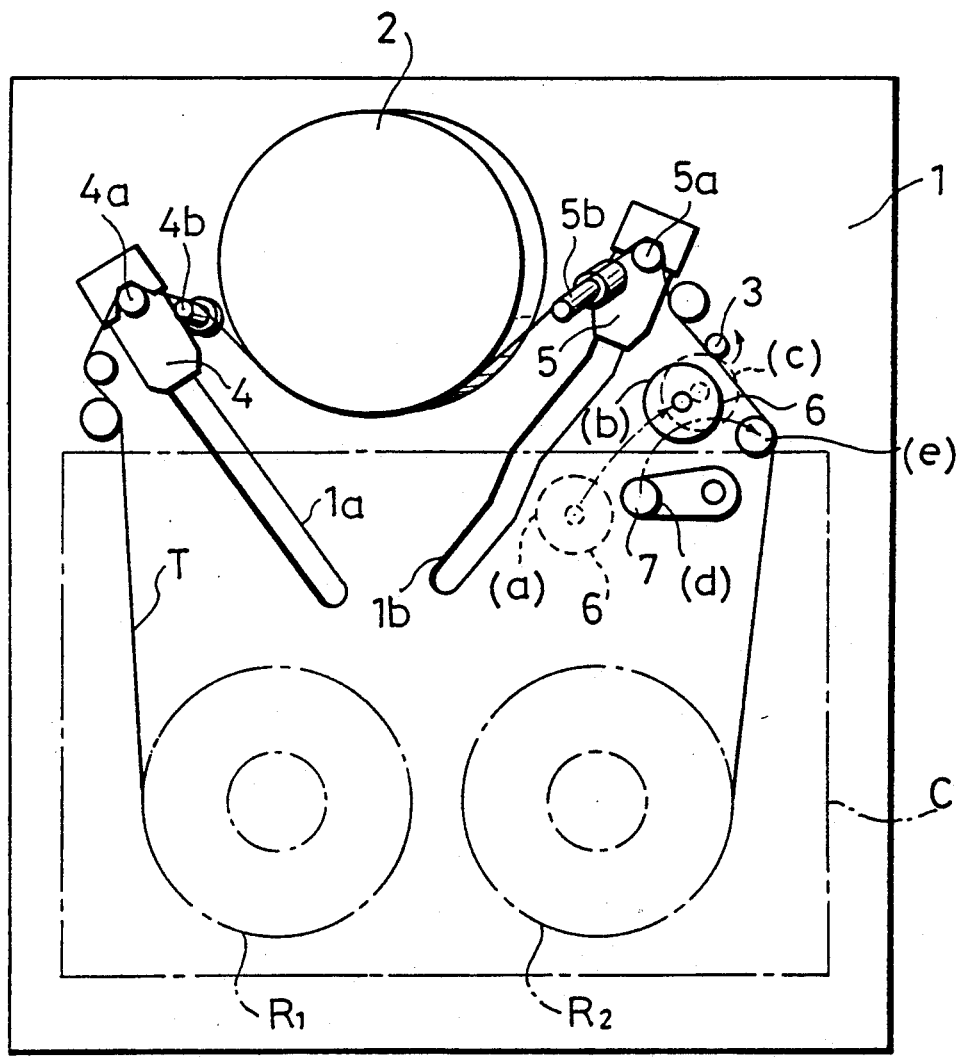
FIG. 6 is a plan view illustrating the tape running state of a conventional rotating head type tape player.

A guide groove 11a is formed in the chassis 11, and a pull-out base 15 is slidably supported. A loading post 15a and an inclined loading pin 15b are provided on the pull-out base 15. In the same way as the example of the conventional art shown in FIG. 6, another drawing base is provided on the opposed side of the rotating head device 12. As a result of the movement of the two pull-out bases, the magnetic tape within a cassette pack is pulled out by the loading post 15a and the loading pin 15b. Reference numeral 16 is a catcher for positioning the pull-out base that moved. The positioning base 15 is provided with a hook 17 for moving a pinch roller 21. The pinch roller 21 is supported by a roller lever 22. One end of the roller lever 22 is rotatably supported in the chassis 11 by a pin 23. The roller lever 22 is energized counterclockwise by a spring 24. As shown in FIG. 2, an energization lever 25 is overlapped under the roller lever 22. This energization lever 25 is rotatably supported to the pin 23 supporting the roller lever 22. A projection 25a is formed in the front end of the energization lever 25, and a projection 22a is formed in the roller lever. The projections 22a and 25a are connected by a spring 26. A bending piece 25b is provided on the energization lever 25, and is hooked to the side of the roller lever 22. The levers 22 and 25 pulled by the spring 26 are formed into one piece by the hooking of the bending piece 25b. As shown in FIG. 2, a link 31 is provided on the rear side of the chassis 11, and is rotatably supported to the chassis 11 by a pin 32. A link 34 is provided on the upper side of the chassis 11, and is connected to the energization lever 25 by a pin 33. Both links 31 and 34 are connected by a connection pin 35 via a segment 11b of the chassis 11.

A switch lever 41 is provided on the upper surface of the chassis 11. This switch lever 41 is arranged to slide in the left and right directions in the figure by being guided by a guide pin 31 and other not-shown guide pins. A press section 41b for pressing the connecting pin 35 is formed on the switch lever 41.

Figure 4:
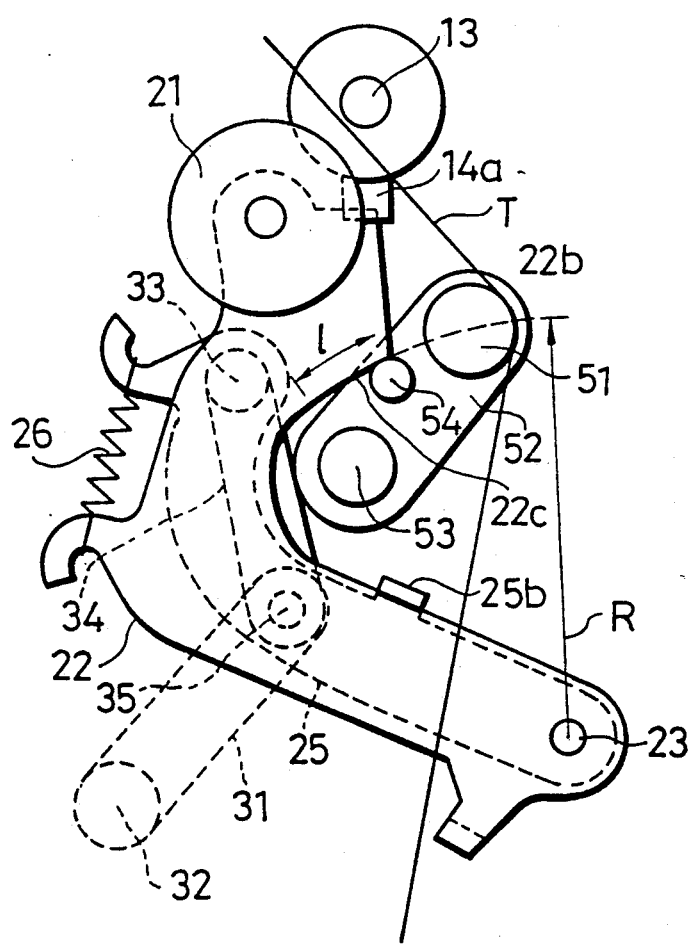
FIGS. 4 and 5 are enlarged plan views for each of the operations.

Reference numeral 51 is a tape guide. It includes a roller which is rotatable. This tape guide 51 is supported on a guide lever. The guide lever 52 is rotatably supported to the chassis 11 by a pin 53. A pin 54 is provided on the guide lever 52. The guide lever 52 is energized counterclockwise by a spring 55. As enlarged and shown in FIG. 4, a press section 22b is formed on the right side of the front end of the roller lever 22, and furthermore a guide section 22c connecting to the press section 22b is formed thereon. As shown in FIG. 4, this guide section 22c is formed in the range of the length l, and is formed in the form of an arc with a fixed radius R to the pin 23 which is the rotation center for the roller lever 22.

The operation will now be explained.

FIGS. 1 and 2 show unloading states. The roller lever 22 and the guide lever 52 are both rotated counterclockwise by the springs 24 and 55. The pull-out base 15 is moved to the base of the guide groove 11a by the power of a loading motor (not shown). When a cassette pack is inserted and this is detected, the loading motor is started and the pull-out base 15 moves toward the catcher 16, a magnetic tape within a cassette pack starting to be pulled out by the loading post 15a and the loading pin 15b. When the pull-out base 15 moves, the hook provided on the pull-out 15 is hooked to an axis 21a of the pinch roller 21. The axis 21a is pulled by the moving force of the pull-out base 15, the roller lever 22 being moved clockwise in opposition to the energization force of the spring 24. Further, a press section 22b on the right side of the tip of the roller lever 22 presses the tip 52a of a guide lever 52, the guide lever 52 being rotated in opposition to the energization force of a spring 55. At this time, the roller lever 22 and the energization lever 25 pull each other by means of a spring 26, and since they are hooked by each other by the bending piece 25b provided on the energization lever 25, both levers 22 and 25 rotate clockwise as one piece. First, the press section 22b of the roller lever 22 presses the front end 52a of the guide lever 52, then presses the pin 54, causing the guide lever to be rotated clockwise. Then, the pull-out base 15 is positioned to the catcher 16. At the completion of the tape loading operation, the pinch roller 21 is close to the capstan 13. The tape guide 51 reaches the position at which it guides the magnetic tape T (see FIG. 4). At this time, the pin provided on the guide lever 52 separates from the press section 22b of the roller lever 22 and reaches the end of an arc guide section 22c.

Figure 5:
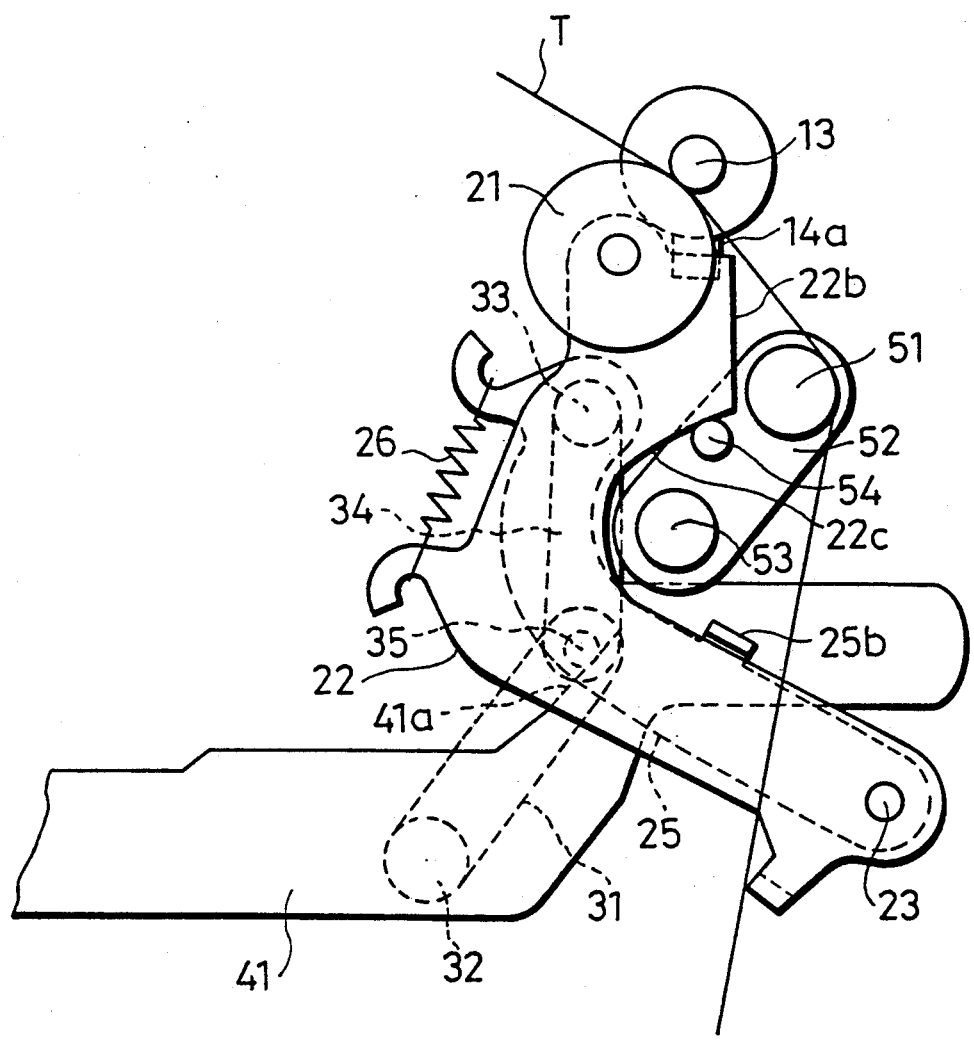

When a play mode for recording or reproducing is set after the completion of the above-described tape loading operation, the switch lever 41 moves rightwardly of the figure by the driving force of a cam which is not shown. Then, a connecting pin 35 connecting links 31 and 34 are pressed leftwardly of the figure by a pressing section 41a provided on the switch lever 41 (see FIG. 5). The connecting pin 35 moves along a segment 11b of the chassis by this pressing force, and as shown in FIG. 5, the links 31 and 34 extends. At this time, the energization lever 25 is rotated clockwise by the link 34. The roller lever 22 is pulled clockwise by the spring 26. The pinch roller 21 is contacted with the capstan 13 by the elasticity of the spring 26. During the changeover of the roller lever 22 from the state of FIG. 4 to that of FIG. 5 as described above, the pin 54 provided on the guide lever 22 is contacted with the guide section 22c of the roller lever 22 by the spring 55, and slides. As shown in FIG. 4, since the guide section 22c is formed in the form of an arc at a fixed radius R from the rotation center of the roller lever 22, the guide lever 52 does not rotate while the roller lever 22 rotates clockwise, and the position of the tape guide 51 is not changed. In other words, since the position of the tape guide 51 is not changed from the state of FIG. 4 in which tape loading operation is completed to the state of FIG. 5 in which the operation changed to a play mode, an additional strong force is not applied to the magnetic tape T pulled out, and the change to the play mode can be made smoothly.

In the embodiment of the figure, the pinch roller is driven by the pull-out base, but the roller lever may be operated by a driving mechanism separate from that of the pull-out base.

As described above, in the present invention, the guide lever is driven by a roller lever, thereby obviating the need for providing mechanisms separately for driving the pinch roller and the tape guide. Since the position of the tape guide does not change during the time from the pinch roller comes to a position close to the capstan to the time it contacts the capstan, an excessive force will not be applied to the tape.

What is claimed is:

1. In a rotating head type tape player with a rotating head device and a capstan, and a tape feeding member that pulls out a magnetic tape from an inserted cassette pack and moves it to the position at which it is wound on said rotating head device and to the position of a capstan provided on a chassis, a tape guide driving device for a rotating head type tape player is characterized in that there are provided a roller lever supporting the pinch roller and moving the pinch roller from the position opposed to the inside of the tape within a cassette pack to the position close to the capstan, and a guide lever supporting the tape guide and moving the tape guide from the position opposed to the inside of the tape within the cassette pack, said roller lever being provided with a press section pressing the projection provided on said guide lever while the pinch roller comes close to the capstan and a guide section on which a projection of said guide lever slides while the pinch roller rotates from the position close to the capstan to the position at which the pinch roller strikes the capstan, said guide section being formed at a fixed radius to the rotation center of the roller lever and being provided with an elastic member for contacting said projection with this guide section.

* * * * *